C. H. BASSETT.
Thill-Coupling.
No 54,840. Patented May 22, 1866.
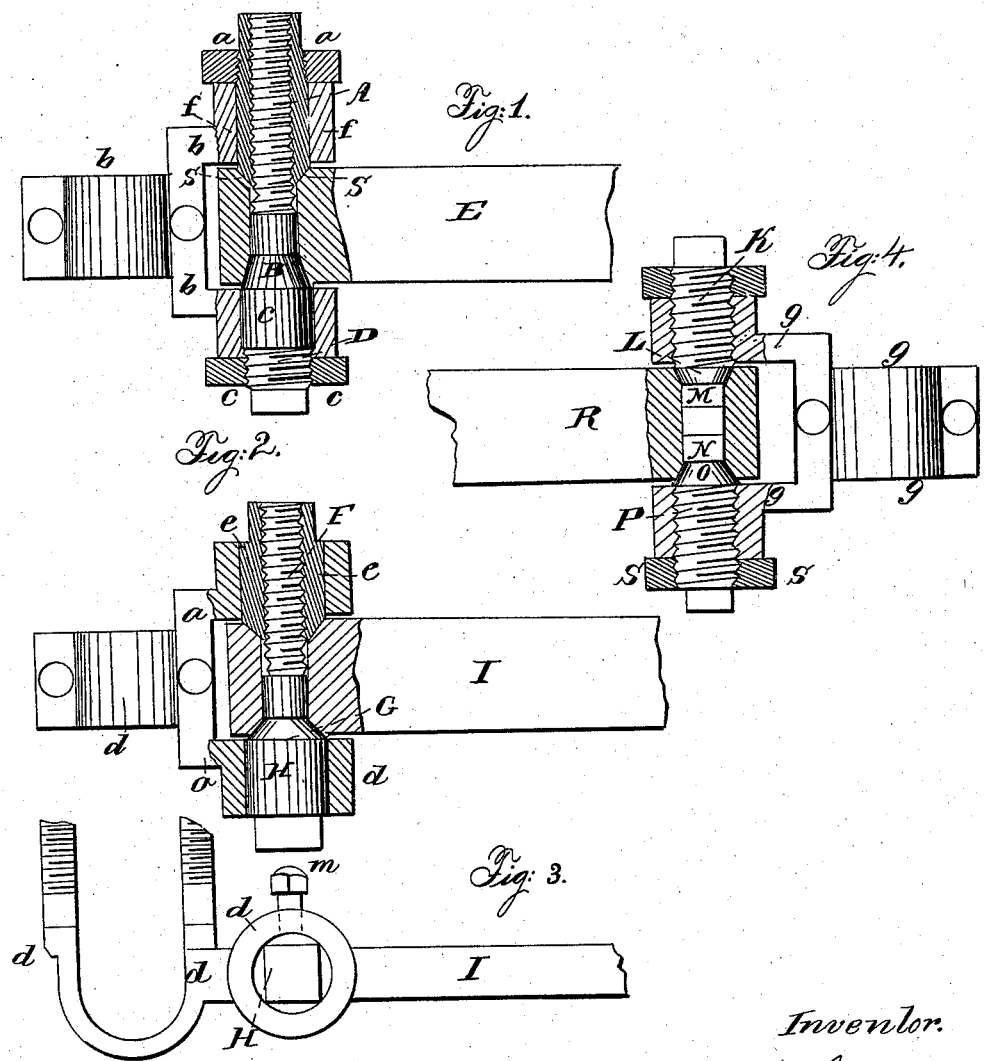

UNITED STATES PATENT OFFICE.

C. H. BASSETT, OF DERBY, CONNECTICUT.

IMPROVEMENT IN COUPLINGS FOR CARRIAGE-THILLS.

Specification forming part of Letters Patent No. 54,840, dated May 22, 1866.

*To all whom it may concern:*

Be it known that I, C. H. BASSETT, of Derby, in county of New Haven, in the State of Connecticut, have invented certain new and useful Improvements in Couplings for Carriage-Shafts; and I do hereby declare that the following is a full and exact description thereof, reference being had to the accompanying drawings, making part of this specification.

My invention relates to a novel method of connecting the thills or shafts of carriages to the carriage, and has for its object to effect such connection in such a manner that there shall be no liability of the parts to become detached, and so that while the carriage is running there shall be no rattle or noise made by the coupling; and to these ends my invention consists in hanging the thill upon a bolt or bolts in such manner as to form a taper bearing or centers upon which the tongue of the shaft can freely turn, and which can be kept always in perfect adjustment, as will be hereinafter more fully explained.

To enable those skilled in the art to make and use my invention, I will proceed to describe its construction and operation more fully, referring by letters to the accompanying drawings, in which—

Figure 1 is a horizontal section of one of my improved shaft-couplings. Fig. 2 is a similar section of a modification of my said invention. Fig. 3 is a side elevation of the same; and Fig. 4 is a horizontal section, showing still another method of carrying out my invention.

At Fig. 1, E represents the metallic strap or tongue of the shaft, which is arranged between the ears of the clip or metallic stand $b$ and there retained by a bolt and nuts in the following manner, viz: Through the ears of the stand $b$ are bored in line two holes, and through the tongue-piece E is also bored a hole somewhat smaller than the holes in ears of stand $b$, but reamed out at each end on a taper to the size of said holes in $b$, and through the ears of stand $b$ and the hole in tongue or strap E is passed a bolt, the peculiar shape of which is clearly shown in the drawings at C. It fills the hole in $b$, through which it passes, and then tapers down at B to fit the tapering portion of the hole in tongue E. It then continues of about the diameter of the straight bore in said tongue E, and is provided with a screw-thread, as seen at A. Over this threaded portion A of the said bolt fits a long nut or a sleeve having a screw-thread on its internal surface, as shown at $f$, and having also, near its outer end and on its exterior, a screw-thread to receive a nut, $a$, which operates as a jam-nut. $c$ is another similar nut, arranged in the portion D of the bolt.

It will be understood that by the arrangement of parts shown the end of the tongue E will be sustained by the bearings on the tapers at B and S, so that it can vibrate or oscillate freely, while at the same time, by turning the screw-sleeve on nut $f$ a little farther on and clamping it with jam-nut $a$, any wear on these tapering bearings may be taken up or compensated for and the mechanism always be kept in a perfect condition, so as to work freely but noiselessly.

At Figs. 2 and 3 the tongue-piece I and clip $a$ are made and arranged relatively the same as seen at Fig. 1; but in these last-named figures the bolt H and nut $e$ are adjusted, as before described, and held in place by means of set-screws $m$, passing through the ears of clip $a$ and pressing, one on the bolt H, the other on the nut $e$.

At Fig. 4 the clip $g$ and tongue-piece R are made and arranged as before explained; but in lieu of the bolt running all the way through the long nut, I employ two shorter screw-bolts, P K, provided each with a jam-nut, S, the tapering portions L and O of said bolts forming the bearings in tongue R, and the straight portions M N passing loosely into the bore of said tongue-piece.

It will be obvious that my invention is subject to numerous modifications, and I therefore wish to be understood as not limiting myself to either of the precise modes shown of carrying out my invention, the great object and advantage of which is the perfect holding of the end of the shaft on a taper bearing or centers, so that, while it is free to oscillate readily, all wear can be taken up and the mechanism kept in perfect working order, without the liability of any noise or rattle, while at the same time the construction is such as to involve great durability at small cost of manufacture.

Having fully explained my invention, so that those skilled in the art can make and use the same, what I claim as new, and desire to secure by Letters Patent, is—

The employment of centers or taper bearings in combination with the tongue-piece and clip and a suitable means of holding the parts in adjustment, substantially as set forth.

In testimony whereof I have hereunto set my hand and seal.

C. H. BASSETT. [L. S.]

Witnesses:
   CHAS. F. COLT,
   CHAS. E. CLARK.